(12) United States Patent
Chang et al.

(10) Patent No.: US 7,671,542 B2
(45) Date of Patent: Mar. 2, 2010

(54) COLOR CONTROL OF MULTI-ZONE LED BACKLIGHT

(75) Inventors: Ya-Hsien Chang, Hsinchu (TW); Jyh-Haur Huang, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 300 days.

(21) Appl. No.: 11/936,511

(22) Filed: Nov. 7, 2007

(65) Prior Publication Data

US 2009/0116232 A1    May 7, 2009

(51) Int. Cl.
*H05B 37/02* (2006.01)
(52) U.S. Cl. .................. 315/307; 315/246; 315/308; 315/312
(58) Field of Classification Search .......... 315/246, 315/250, 291, 307, 308, 312, 324, 360
See application file for complete search history.

(56) References Cited

U.S. PATENT DOCUMENTS

| | | | |
|---|---|---|---|
| 6,441,558 B1 | 8/2002 | Muthu et al. | |
| 6,507,159 B2 * | 1/2003 | Muthu | 315/307 |
| 6,630,801 B2 | 10/2003 | Schuurmans | |
| 7,317,288 B2 * | 1/2008 | Lin et al. | 315/291 |
| 2005/0259439 A1 | 11/2005 | Cull et al. | |
| 2005/0273237 A1 * | 12/2005 | Huang et al. | 701/49 |
| 2006/0022616 A1 | 2/2006 | Furukawa et al. | |
| 2007/0091057 A1 * | 4/2007 | Lee et al. | 345/102 |

* cited by examiner

*Primary Examiner*—Thuy Vinh Tran
(74) *Attorney, Agent, or Firm*—Morris, Manning & Martin LLP; Tim Tingkang Xia

(57) ABSTRACT

The present invention relates to a light emitting diode (LED) backlight having a plurality of LED strips, in which driving current supplied to each of the plurality of LED strips is adjusted according to measured differences in chromaticity coordinates between the actual light chromaticity and brightness output by each LED strip and a desired light chromaticity and brightness of each LED so that the LED backlight generates light of a desired color with a uniform brightness, and methods of operating the same.

20 Claims, 4 Drawing Sheets

COLOR CONTROL OF MULTI-ZONE LED BACKLIGHT

FIELD OF THE INVENTION

The present invention relates generally to a light emitting diode (LED) backlight, and more particularly, to an LED backlight having a plurality of LED strips, in which driving current supplied to each of the plurality of LED strips is adjusted according to measured differences in chromaticity coordinates between the actual light chromaticity and brightness output by each LED strip and a desired light chromaticity and brightness of each LED so that the LED backlight generates light of a desired color with a uniform brightness, and methods of operating the same.

BACKGROUND OF THE INVENTION

Liquid crystal displays (LCDs) are commonly used as display devices because of their capability of displaying images with good quality while using little power. However, liquid crystals in an LCD do not emit any light themselves. The liquid crystals have to be lit up by a light source so as to clearly and sharply display text and images. Usually, a backlight is employed as such a light source. Light emitting diode (LED) array modules have recently emerged as a new backlight source and become increasingly popular.

An LCD backlight typically includes a plurality of red, green and blue (RGB) LEDs, regularly arranged to form a number of LED areas, and driven electrically to produce various colors of light including white light. Generally, the characteristics of individual RGB LEDs varies with the temperature, driving current, and aging. The characteristics also varies from batch to batch for the same LED fabrication process and from manufacturer to manufacturer. Consequently, the light produced by an RGB LED based backlight module may have non-uniformity of brightness and colorfulness over different LED areas of the backlight module. In addition, the temperature differences between different LED areas are also affected by image data to be displayed on an LCD, and thus are hardly predicted, which may make the non-uniformity of brightness and colorfulness of the light even worse. To ensure an LED backlight to produce light with uniform brightness and desired colorfulness, a suitable feedback control system is usually utilized to monitor the chromaticity and/or brightness (luminescence) of the light emitted from each LED area.

One known feedback system includes a plurality of photo-sensors. Each photo-sensor is configured to individually monitor the chromaticity of the light emitted from a corresponding LED area. The monitored chromaticity of the emitted light is then fed back to a controller that adjusts the driving current of the LED area accordingly, thereby controlling the color of the light emitted from each LED area at a desired chromaticity. Other feedback systems include one or more temperature detectors for monitoring the temperature of each LED area. Then the driving current of each LED area is adjusted according to the measured temperatures. However, such feedback systems require multi-color sensor or temperature sensor to guarantee the uniformity. Thus these systems result in sophisticated control circuitry and are not cost-effective.

Therefore, a heretofore unaddressed need exists in the art to address the aforementioned deficiencies and inadequacies.

SUMMARY OF THE INVENTION

The present invention, in one aspect, relates to a method for operating an LED backlight having a plurality of LED strips, $\{S_i\}$, where i=1, 2, 3, ..., N, N being a positive integer. Each LED strip $S_i$ is configured to receive a driving current, $C_i$, and in response thereto, to emit light, $L_i$. The light $L_i$ is characterizeable with a chromaticity and brightness in terms of chromaticity coordinates, $Luv_i$, which are associated with the driving current $C_i$. In one embodiment, each LED strip $S_i$ includes a number of red, green and blue (RGB) LEDs spatial-regularly arranged, and each type of RGB LEDs is electrically coupled together.

In one embodiment, the method comprises the steps of (a) supplying each of the plurality of LED strips $\{S_i\}$ with a corresponding driving current $C_i$ by means of pulse width modulation (PWM) to cause it to emit light $L_i$; (b) imposing a time delay or a phase shift on a PWM driving current $C_k$ supplied to an LED strip $S_k$ to be monitored, where the time delay or the phase shift is chosen so that it has no effect on the chromaticity coordinates $Luv_k$ of the light $L_k$ emitted from the LED strip $S_k$, wherein k=1, 2, 3, ... or N; (c) measuring the chromaticity coordinates $Luv_k$ of the light $L_k$ emitted from the LED strip $S_k$ when the time delay or the phase shift is monitored; (d) comparing the measured chromaticity coordinates $Luv_k$ of the light $L_k$ with a reference chromaticity coordinates, $Ruv_k$, of light for the LED strip $S_k$; (e) adjusting the PWM driving current $C_k$ supplied to the LED strip $S_k$ so that the measured chromaticity coordinates $Luv_k$ are identical to the reference chromaticity coordinates $Ruv_k$ for the LED strips $S_k$; and (f) repeating steps (b)-(e) for each of the rest of the plurality of LED strips $\{S_i\}$, so as to make light emitted from the plurality of LED strips $\{S_i\}$ have a substantially uniform chromaticity and a substantially uniform brightness.

In one embodiment, the adjusting step is performed by adjusting a duty cycle of the PWM driving current $C_k$. In another embodiment, the adjusting step is performed by adjusting an amplitude of the PWM driving current $C_k$.

In one embodiment, the PWM driving current $C_i$ supplied to the LED strip $S_i$ includes three PWM currents, $C_{iR}$, $C_{iG}$ and $C_{iB}$, to drive each type of RGB LEDs, respectively.

In one embodiment, the reference chromaticity coordinates $Ruv_i$ of light for an LED strips $S_i$ is obtained according to the steps of: supplying each of the plurality of LED strips $\{S_i\}$ with a PWM driving current $C_i$ to cause it to emit light $L_i$; measuring the chromaticity coordinates $Luv_i$ of the light $L_i$ emitted from each of the plurality of LED strips $\{S_i\}$ individually; imposing a time delay or a phase shift on a PWM driving current $C_{ref}$ supplied to an LED strip $S_{ref}$ to be referenced, where the time delay or the phase shift is chosen so that it has no effect on the chromaticity coordinates $Luv_{ref}$ of the light $L_{ref}$ emitted from the referenced LED strip $S_{ref}$, where ref=1, 2, 3, ... or N; measuring the chromaticity coordinates $Luv_{ref}$ of the light $L_{ref}$ emitted from the referenced LED strip $S_{ref}$ when the time delay or the phase shift is monitored; calculating a color shift, $\Delta uv_{if}$, and brightness shift, $\Delta I_{if}$, of the light $L_i$ of the LED strip $S_i$ from the light $L_{ref}$ of the referenced LED strip $S_{ref}$ from the chromaticity coordinates $Luv_i$ and $Luv_{ref}$; and adjusting the PWM driving current $C_i$ supplied to the LED strip $S_i$ so that $\Delta uv_{if}=0$, and $\Delta I_{if}=0$, thereby obtaining the reference chromaticity coordinates $Ruv_i$ of light for the LED strip $S_i$, which is corresponding to the chromaticity coordinates $Luv_i$ of the light $L_i$ emitted from the LED strips $S_i$ having $\Delta uv_{if}=0$, and $\Delta I_{if}=0$. The reference chromaticity coordinates $Ruv_i$ of light for the LED strips $S_i$ is stored in a lookup table (LUT).

In another aspect, the present invention relates to a method for operating a light emitting diode (LED) backlight to illuminate a liquid crystal display (LCD). The LED backlight has a plurality of LED strips, $\{S_i\}$, where $i=1, 2, 3, \ldots, N$, N being a positive integer. Each LED strip $S_i$ has a number of RGB LEDs spatial-regularly arranged. Each type of RGB LEDs is electrically coupled together and configured to receive a driving current, $C_{iZ}$, and in response thereto, to emit light of a Z color, where Z=R, G or B.

In one embodiment, the method includes the steps of: (a) supplying each of the plurality of LED strips $\{S_i\}$ with a corresponding driving current $C_i$ by means of PWM to cause it to emit light, where the PWM driving current $C_i$ comprises three PWM currents, $C_{iR}$, $C_{iG}$ and $C_{iB}$, for driving each type of RGB LEDs, respectively; (b) measuring intensities, $I_{iR}$, $I_{iG}$ and $I_{iB}$, of light emitted from each type of RGB LEDs of an LED strip $S_i$, respectively; (c) determining for the LED strip $S_i$ $$F_{iZ}=(I_{iZ}/gateD)*Z\_duty;$$

$$Chromaticity_{iZ}=F_{iZ}/(F_{iR}+F_{iG}+F_{iB}); \text{ and}$$

$$Brightness_i=(F_{iR}+F_{iG}+F_{iB})*Gain_i,$$

where $F_{iZ}$ is the flux of light of the Z color, gateD is a duty cycle of a gate signal driving the LCD, Z_duty is a duty cycle of the PWM current $C_{iZ}$, and Z=R, G, or B; (d) comparing the determined chromaticity and brightness of the light emitted from the LED strip $S_i$ with a reference chromaticity and brightness of light for the LED strips $S_i$; (e) adjusting the PWM driving current $C_i$ supplied to the LED strip $S_i$ so that the chromaticity and brightness of the light emitted from the LED strip $S_i$ are identical to the reference chromaticity and brightness of light for the LED strips $S_i$; and (f) repeating steps (b)-(e) for each of the rest of the plurality of LED strips $\{S_i\}$, so as to make light emitted from the plurality of LED strips $\{S_i\}$ have a substantially uniform chromaticity and a substantially uniform brightness. The reference chromaticity and brightness of light for each LED strips $S_i$ is stored in a LUT.

In one embodiment, the measuring step comprises the steps of: imposing a time delay or a phase shift on the PWM driving current $C_i$ supplied to the LED strip $S_i$, wherein the time delay or the phase shift is chosen so that it has no effect on a chromaticity and brightness of the light emitted from the LED strip $S_i$; and measuring intensities, $I_{iR}$, $I_{iG}$ and $I_{iB}$, of light emitted from each type of RGB LEDs of the LED strip $S_i$, respectively, when the time delay or the phase shift is detected.

In one embodiment, the adjusting step is performed by adjusting a duty cycle of the PWM driving current $C_k$. In another embodiment, the adjusting step is performed by adjusting an amplitude of the PWM driving current $C_k$.

In yet another aspect, the present invention relates to an LED backlight. In one embodiment, the LED backlight includes a plurality of LED strips, $\{S_i\}$, where $i=1, 2, 3, \ldots, N$, N being a positive integer. Each LED strip $S_i$ has a number of RGB LEDs spatial-regularly arranged for emitting light. Each type of RGB LEDs is electrically coupled together. The LED backlight further includes a driver unit, a sensor unit and a controller. The driver unit, the plurality of LED strips $\{S_i\}$, the sensor unit and the controller constitute a close loop control system.

The driver unit is electrically coupled with the plurality of LED strips $\{S_i\}$ and configured to individually supply each of the plurality of LED strips $\{S_i\}$ with a corresponding driving current, $C_i$, by means of PWM to cause it to emit light, $L_i$. The light $L_i$ is characterizeable with a chromaticity and brightness in terms of chromaticity coordinates, $Luv_i$, which are associated with the supplied current to the LED strip $S_i$.

The sensor unit is optically coupled with the plurality of LED strips $\{S_i\}$ and configured to individually detect the chromaticity coordinates, $Luv_i$, of the light $L_i$ emitted from each LED strip $S_i$. In one embodiment, the sensor unit is capable of detecting the time delay or the phase shift so as to determine the light emitted from which LED strip to be measured.

The controller is in communication with the sensor unit and the driver unit and configured to receive from the sensor unit the detected chromaticity coordinates $Luv_i$ of the light $L_i$ emitted from each LED strip $S_i$, and determine the driving current $C_i$ to be supplied from the driver unit to each LED strip $S_i$ according to the received chromaticity coordinates $Luv_i$ of the light $L_i$ emitted from each LED strip $S_i$ so as to make light emitted from the plurality of LED strips $\{S_i\}$ have a substantially uniform chromaticity and a substantially uniform brightness. The controller is capable of imposing a time delay or a phase shift on a PWM driving current $C_k$ supplied to an LED strip $S_i$ to be monitored, and wherein the time delay or the phase shift is chosen so that it has no effect on the chromaticity coordinates $Luv_i$ of the light $L_i$ emitted from the LED strip $S_i$.

In one embodiment, the driving current $C_i$ supplied from the driver unit to an LED strip $S_i$ is in the form of a PWM signal having a duty cycle and amplitude that are adjustable. The PWM driving current $C_i$ supplied to the LED strip $S_i$ comprises three PWM currents, $C_{iR}$, $C_{iG}$ and $C_{iB}$, adapted for driving each type of RGB LEDs, respectively.

The LED backlight may also include an LUT stored in the controller, and wherein the LUT contains information of and the reference chromaticity coordinates $Luv_i$ of the light $L_i$ and corresponding driving current for each of the plurality of LED strips $\{S_i\}$.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
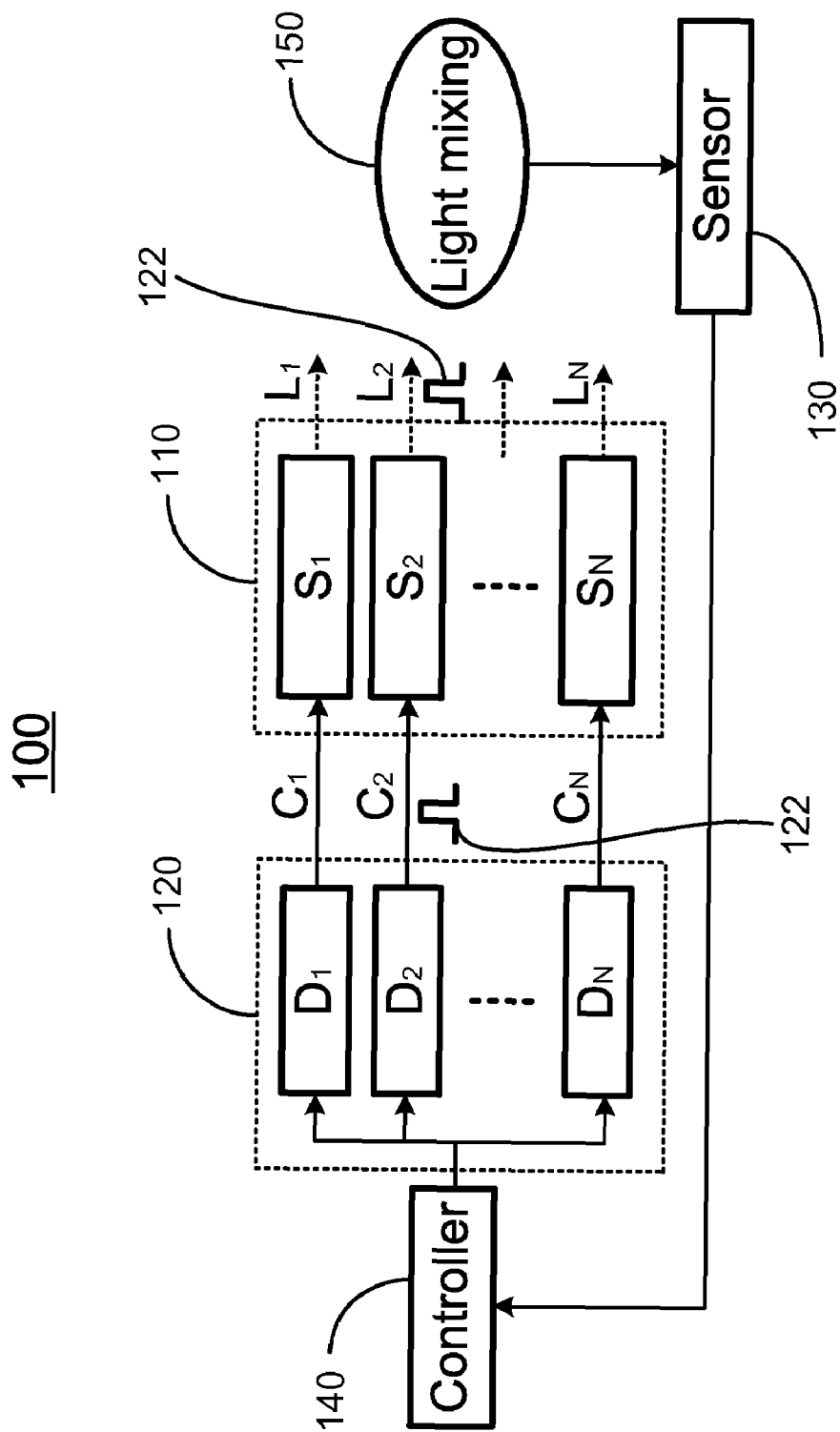
FIG. 1 shows schematically an LED backlight according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-4. In accordance with the purposes of this invention, as embodied and broadly described herein, this invention, in one aspect, relates to an LED backlight having a plurality of LED strips, in which driving current supplied to each of the plurality of LED strips is adjusted according to measured differences in chromaticity coordinates between the actual light chromaticity and brightness output by each LED strip and a desired light chromaticity and brightness of each LED strip so that the LED backlight generates light of a desired color with a uniform brightness.

Referring to FIG. 1, an LED backlight 100 is schematically shown according to one embodiment of the present invention. The LED backlight 100 has a plurality of LED strips $\{S_i\}$ 110, where i=1, 2, 3, ..., N, N being a positive integer. Each LED strip $S_i$ has a number of RGB LEDs spatial-regularly arranged for emitting light, and each type of RGB LEDs is electrically coupled together (not shown). Each LED strip $S_i$ is configured to receive a driving current, $C_i$, and in response thereto, to emit light, $L_i$.

The LED backlight 100 further includes a driver unit 120, a sensor unit 130 and a controller 140. The driver unit 120, the plurality of LED strips $\{S_i\}$ 110, the sensor unit 130 and the controller 150 form a close loop feedback control system that regulates the chromaticity and brightness of light emitted from each LED strip $S_i$ of the LED backlight 100 to a desired chromaticity and brightness. Additionally, the LED backlight 100 may have a light mixing unit 150 positioned between the plurality of LED strips $\{S_i\}$ 110 and the sensor unit 130 for uniformly mixing the light emitted from the plurality of LED strips $\{S_i\}$ 110.

The driver unit 120 includes a plurality of drivers, $\{D_i\}$. Each driver $D_i$ is electrically coupled to a corresponding LED strip $S_i$ and configured to supply the LED strip $S_i$ with a corresponding driving current, $C_i$, to cause it to emit light, $L_i$. The light $L_i$ is characterizeable with a chromaticity and brightness in terms of chromaticity coordinates, $Luv_i$, which are associated with the supplied current $C_i$ to the LED strip $S_i$. The driving current $C_i$ supplied from the driver unit 120 to an LED strip $S_i$ is in the form of a PWM signal having a duty cycle and amplitude that are adjustable. The PWM driving current $C_i$ may have three PWM currents, $C_{iR}$, $C_{iG}$ and $C_{iB}$, to drive each type of RGB LEDs, respectively.

The sensor unit 130 is optically coupled, optionally via the light mixing unit 150, to the plurality of LED strips $\{S_i\}$ 110, and configured to individually detect the chromaticity coordinates, $Luv_i$, of the light $L_i$ emitted from each of the plurality of LED strips $\{S_i\}$ 110. The sensor unit 130 may include a red light sensor, a green light sensor and a blue light sensor for detecting intensity/brightness of the light emitted from the red LEDs, the green LEDs and the blue LEDs of an LED strip $S_i$, respectively. The detected intensity/brightness of the light emitted from the red LEDs, the green LEDs and the blue LEDs of the LED strip $S_i$ are used to obtain the chromaticity coordinates, $Luv_i$, of the light $L_i$ emitted from the LED strip $S_i$. Alternatively, the sensor unit 130 may have a color filter capable of detecting different color portions of the light emitted from the LED strip $S_i$.

The controller 140 is in communication with the sensor unit 130 and the driver unit 120, and configured to receive from the sensor unit 130 the detected chromaticity coordinates $Luv_i$ of the light $L_i$ emitted from each LED strip $S_i$, and regulate the driving current $C_i$ to be supplied from the driver unit 120 to each LED strip $S_i$ according to the received chromaticity coordinates $Luv_i$ of the light $L_i$ emitted from each LED strip $S_i$ so as to make light emitted from the plurality of LED strips $\{S_i\}$ have a substantially uniform chromaticity and a substantially uniform brightness.

In operation, in order to detect the chromaticity coordinates $Luv_i$ of the light $L_i$ emitted from an LED strip $S_i$, a time delay, $\Delta t$, or a phase shift, $\Delta\phi=2\pi\nu\Delta t$, is imposed by the controller 140 on a PWM driving current $C_i$ supplying from the driver $D_i$ to the LED strip $S_i$. The time delay $\Delta t$ or the phase shift $\Delta\phi$ is chosen so that it has no effect on the chromaticity coordinates $Luv_i$ of the light $L_i$ emitted from the LED strip $S_i$, but is detectable by the sensor unit 130. For example, the phase shift $\Delta\phi$ (or the time delay $\Delta t$) can be chosen to have a value corresponding to a small perturbation in a range of 0-$\pi$/10, imposed on the PWM driving current $C_i$. When the sensor unit 130 detects such a time delay $\Delta t$ or a phase shift $\Delta\phi$ in the driving current $C_i$, the chromaticity coordinates $Luv_i$ of the light $L_i$ detected by the sensor unit 130 is corresponding to that of the light emitted from the LED strip $S_i$. The detected chromaticity coordinates $Luv_i$ of the light $L_i$ emitted from the LED strip $S_i$ is fed back to the controller 140, which in turn compares it with reference chromaticity coordinates $Ruv_i$ of light for the LED strip $S_i$ and determines the driving current $C_i$ to be supplied to the LED strip $S_i$ so that the detected chromaticity coordinates $Luv_i$ of the light $L_i$ emitted from the LED strip $S_i$ is identical to the reference chromaticity coordinates $Ruv_i$ of light for the LED strip $S_i$. The driving current $C_i$ can be adjusted in terms of its duty cycle and/or amplitude, so as to regulate the chromaticity coordinates $Luv_i$ of the light $L_i$ emitted from the LED strip $S_i$ to the reference chromaticity coordinates $Ruv_i$ of light for the LED strip $S_i$.

In one embodiment, the reference chromaticity coordinates $Ruv_i$ of light for each of the plurality of LED strips $\{S_i\}$ is contained in an LUT that is stored in the controller 140. The LUT may also contain information of corresponding driving current for each of the plurality of LED strips $\{S_i\}$.

Figure 2A:
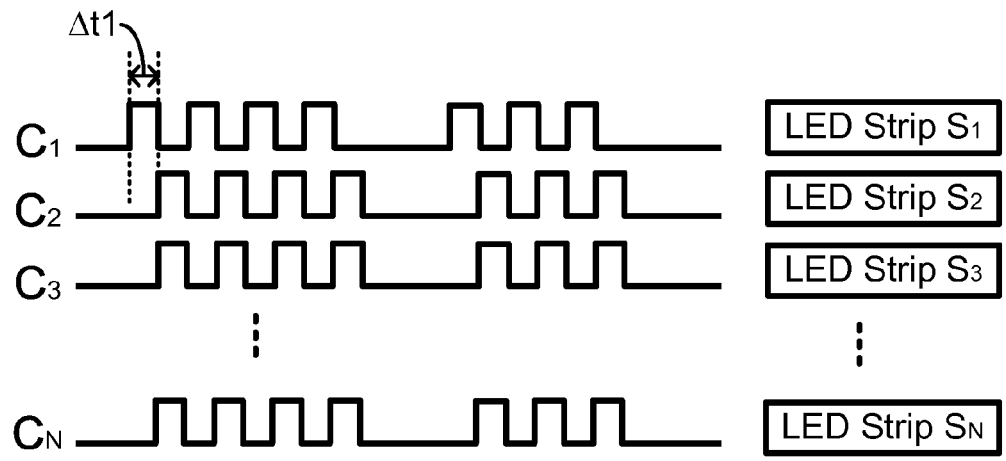
FIGS. 2(a) and 2(b) show schematically timing charts of current of driving an LED backlight according to embodiments of the present invention.
Figure 2B:
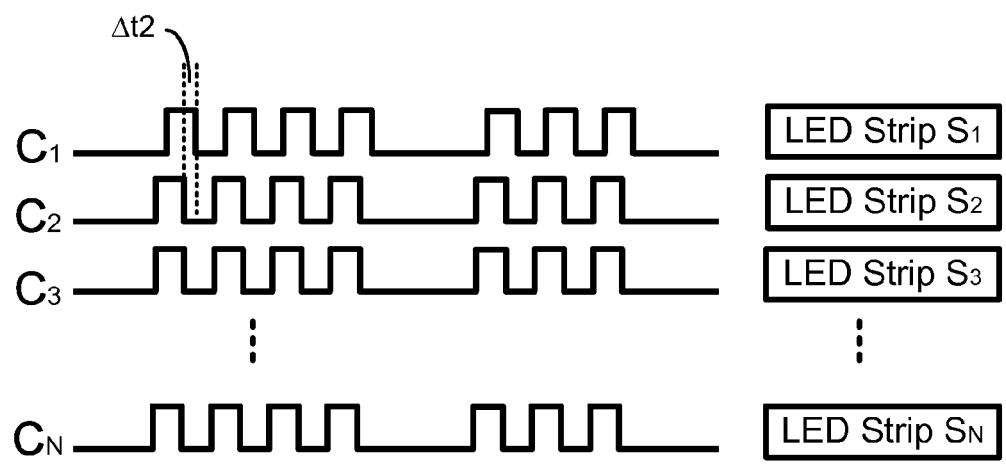

FIGS. 2(a) and 2(b) show schematically timing charts of current of driving an LED backlight according to embodiments of the present invention, where a time delay, $\Delta t1$ or $\Delta t2$, is imposed on the driving current $C_1$ of the LED strip $S_1$. For the embodiment of FIG. 2(a), the light is emitted from the LED strip $S_1$ earlier than that from the LED strip $S_2$, LED strip $S_3$, ... and LED strip $S_N$, by $\Delta t1$. Accordingly, the light detected by the sensor unit in the duration of 0-$\Delta t1$ is corresponding to the light emitted from the LED strip $S_1$. However, for the embodiment of FIG. 2(b), the light is emitted from the LED strip $S_1$ later than that from the LED strip $S_2$, LED strip $S_3$, ... and LED strip $S_N$, by a small time delay $\Delta t2$. In the embodiment, the light detected by the sensor unit in the duration of $\Delta t2$ after the LED strip $S_2$, LED strip $S_3$, ... and LED strip $S_N$ emit no light is proportional to the light emitted from the LED strip $S_1$.

Figure 3:
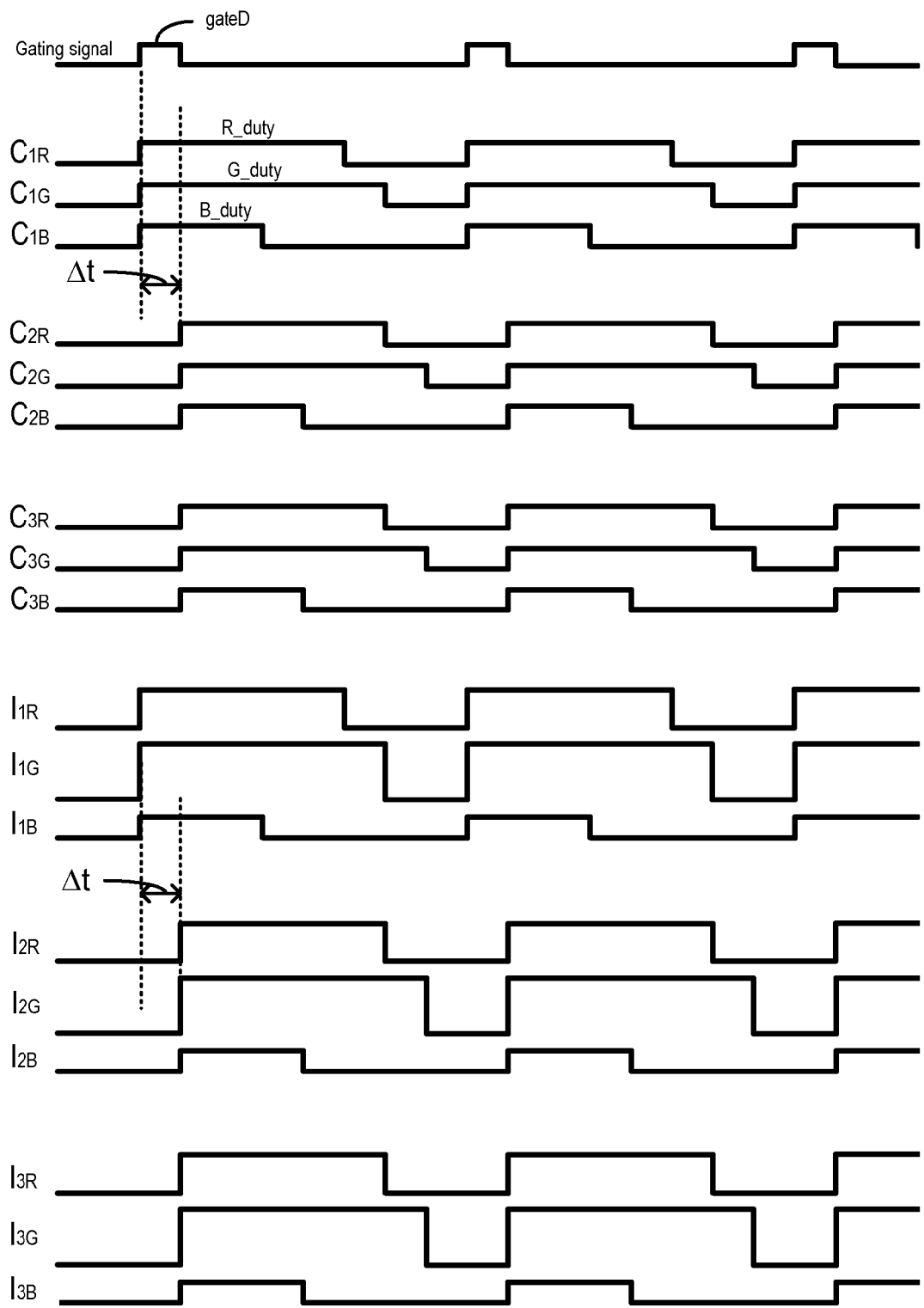
FIG. 3 shows schematically timing charts of driving current and light intensities of an LED backlight according to one embodiment of the present invention.

Referring to FIG. 3, timing charts of driving current and light intensities of an LED backlight are schematically shown according to another embodiment of the present invention. In the embodiment, each type of red, green and blue LEDs in each LED strip $S_i$ is electrically driven by a PWM current, $C_{iR}$, $C_{iG}$ and $C_{iB}$, respectively. It is known that each type of red, green and blue LEDs differs in emission efficiency. In other words, they differ in power consumption and emission efficiency. Therefore, the duty cycle (pulse width) of each PWM current, $C_{iR}$, $C_{iG}$ or $C_{iB}$ varies accordingly. For example, the duty cycle, G_duty of the PWM current $C_{iG}$ is greater than the duty cycle, R_duty of the PWM current $C_{iR}$, which in turn is greater than the duty cycle, B_duty of the PWM current $C_{iB}$, i.e., G_duty>R_duty>B_duty, as shown in FIG. 3.

In one embodiment, by measuring intensities, $I_{iR}$, $I_{iG}$ and $I_{iB}$, of light emitted from each type of RGB LEDs of an LED strip $S_i$, respectively, the chromaticity and brightness of the light emitted from LED strip $S_i$ can be determined as follows:

$$F_{iZ}=(I_{iZ}/gateD)*Z\_duty;$$

$$Chromaticity_{iZ}=F_{iZ}/(F_{iR}+F_{iG}+F_{iB}); \text{ and}$$

$$Brightness_i=(F_{iR}+F_{iG}+F_{iB})*Gain_i,$$

where $F_{iZ}$ is the flux of light of the Z color, gateD is a duty cycle of a gate signal, Z duty is the duty cycle of the PWM current $C_{iZ}$, and Z=R, G, or B.

In the embodiment of FIG. 3, the PWM currents $C_{1R}$, $C_{1G}$ and $C_{1B}$ of the LED strip $S_1$ have a time difference, $\Delta t$, from these of the LED strips $S_2$, $S_3$, . . . and $S_N$. Accordingly, the light detected in the duration of 0-$\Delta t$ is corresponding (proportional) to the light emitted from the LED strip $S_1$. The detected light is then fed back to the controller for further regulating the PWM currents $C_{1R}$, $C_{1G}$ and $C_{1B}$ of the LED strip $S_1$. Similarly, the PWM currents $C_{2R}$, $C_{2G}$ and $C_{2B}$, of the LED strip $S_2$, the PWM currents $C_{3R}$, $C_{3G}$ and $C_{2B}$ of the LED strip $S_3$, . . . and the PWM currents $C_{NR}$, $C_{NG}$, $C_{NB}$ of the LED strip $S_N$ can also be regulated according to above process.

Figure 4:
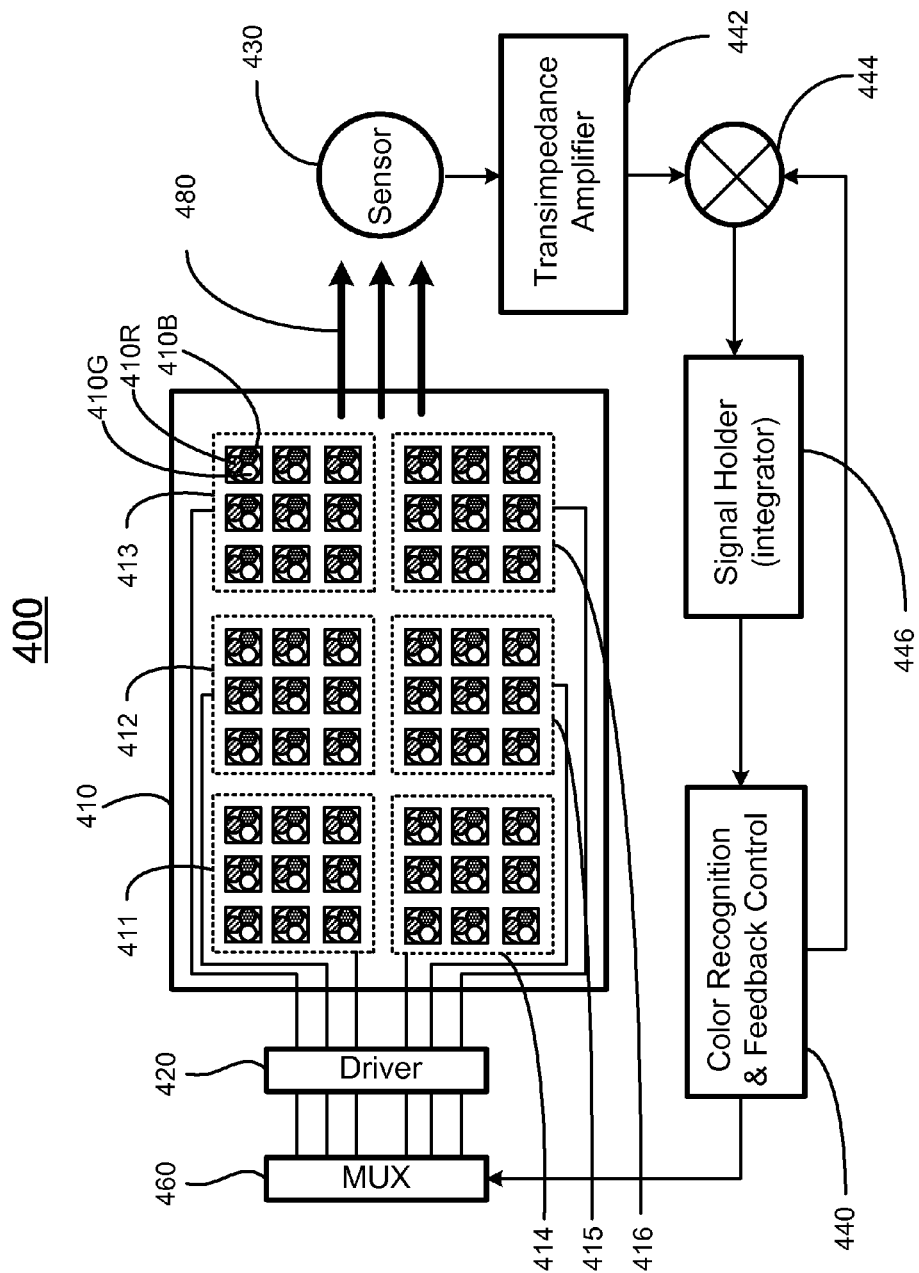
FIG. 4 shows schematically an LED backlight according to another embodiment of the present invention.

FIG. 4 shows schematically an LED backlight 400 according to one embodiment of the present invention. The LED backlight 400 has six LED strips 411-416 secured to a backlight board 410. Other numbers of LED strips can also be utilized to practice the present invention. Each LED strip has nine red LEDs 410R, nine green LEDs 410G and nine blue LEDs 410B spatial-regularly arranged in the form of a matrix. Each LED strip is electrically coupled to a driver 420 for receiving a corresponding driving current and in response thereto, emitting light 480. The light 480 is detected by a sensor 430 that is optically coupled to the LED strips 411-416. The detected signal of the light 480 by the sensor 430 is transmitted to a controller 440 through a transimpedance amplifier 442, a gating controller 444 and a signal holder (integrator) 446. The detected signal is then processed by the controller 440 according to the reference value for the monitored LED strip contained in a LUT that is stored in the controller 440. Accordingly, a signal is transmitted from the controller 440 to the driver 420 through an MUX unit 460. In response, the driver 420 generates a regulating current supplying to the monitored LED strip for regulating the light therefrom.

One aspect of the present invention relates to a method for operating an LED backlight having a plurality of LED strips $\{S_i\}$, where I=1, 2, 3, . . . N, N being a positive integer. The method in one embodiment includes the following steps. At step (a), each of the plurality of LED strips $\{S_i\}$ is supplied with a corresponding driving current $C_i$ by means of PWM to cause it to emit light $L_i$, which is characterizeable with a chromaticity and brightness in terms of the chromaticity coordinates $Luv_k$, which are associated with the driving current $C_i$.

At step (b), a time delay $\Delta t$ or a phase shift $\Delta \phi$ is imposed on a PWM driving current $C_k$ supplied to an LED strip $S_k$ to be monitored, where k=1, 2, 3, . . . or N. The time delay $\Delta t$ or the phase shift $\Delta \phi$ is chosen so that it has no effect on the chromaticity coordinates $Luv_k$ of the light $L_k$ emitted from the LED strip $S_k$. In one embodiment, the time delay $\Delta t$ or the phase shift $\Delta \phi$ is substantially small, but is detectable. For example, the phase shift $\Delta \phi$ (or the time delay $\Delta t$) can be chosen to have a value corresponding to a small perturbation in a range of 0-$\pi/10$, imposed on the PWM driving current $C_k$.

At step (c), the chromaticity coordinates $Luv_k$ of the light $L_k$ emitted from the LED strip $S_k$ is measured when the time delay $\Delta t$ or the phase shift $\Delta \phi$ is monitored.

At step (d), the measured chromaticity coordinates $Luv_k$ of the light $L_k$ are compared with a reference chromaticity coordinates, $Ruv_k$, of light for the LED strip $S_k$.

At step (e), the PWM driving current $C_k$ supplied to the LED strip $S_k$ is adjusted so that the measured chromaticity coordinates $Luv_k$ are identical to the reference chromaticity coordinates $Ruv_k$ for the LED strips $S_k$. The adjusting step can be performed by adjusting a duty cycle and/or amplitude of the PWM driving current $C_k$.

At step (f), steps (b)-(e) are repeated for each of the rest of the plurality of LED strips $\{S_i\}$, so as to make light emitted from the plurality of LED strips $\{S_i\}$ have a uniform chromaticity and a uniform brightness.

In one embodiment, the reference chromaticity coordinates $Ruv_i$ of light for an LED strips $S_i$ is obtained according to the steps of: supplying each of the plurality of LED strips $\{S_i\}$ with a PWM driving current $C_i$ to cause it to emit light $L_i$; measuring the chromaticity coordinates $Luv_i$ of the light $L_i$ emitted from each of the plurality of LED strips $\{S_i\}$ individually; imposing a time delay or a phase shift on a PWM driving current $C_{ref}$ supplied to an LED strip $S_{ref}$ to be referenced, wherein the time delay or the phase shift is chosen so that it has no effect on the chromaticity coordinates $LUV_{ref}$ of the light $L_{ref}$ emitted from the referenced LED strip $S_{ref}$, wherein ref=1, 2, 3, . . . or N; measuring the chromaticity coordinates $LUV_{ref}$ of the light $L_{ref}$ emitted from the referenced LED strip $S_{ref}$ when the time delay or the phase shift is monitored; calculating a color shift, $\Delta uv_{i}$, and brightness shift, $\Delta I_{i}$, of the light $L_i$ of the LED strip $S_i$ from the light $L_{ref}$ of the referenced LED strip $S_{ref}$ from the chromaticity coordinates $Luv_i$ and $Luv_{ref}$; and adjusting the PWM driving current $C_i$ supplied to the LED strip $S_i$ so that $\Delta uv_{i}=0$, and $\Delta I_{i}=0$, thereby obtaining the reference chromaticity coordinates $Ruv_i$ of light for the LED strip $S_i$, which is corresponding to the chromaticity coordinates $Luv_i$ of the light $L_i$ emitted from the LED strips $S_i$ having $\Delta uv_{i}=0$, and $\Delta I_{i}=0$. The reference chromaticity coordinates $Ruv_i$ of light for the LED strips $S_i$ is stored in an LUT.

Another aspect of the present invention relates to a method for operating an LED backlight to illuminate a liquid crystal display (LCD). The LED backlight has a plurality of LED strips, $\{S_i\}$, where i=1, 2, 3, . . . , N, N being a positive integer. Each LED strip $S_i$ has a number of RGB LEDs spatial-regularly arranged. Each type of RGB LEDs is electrically coupled together and configured to receive a driving current, $C_{iZ}$, and in response thereto, to emit light of a Z color, where Z=R, G or B.

In one embodiment, the method includes the steps of: (a) supplying each of the plurality of LED strips $\{S_i\}$ with a corresponding driving current $C_i$ by means of PWM to cause it to emit light, wherein the PWM driving current $C_i$ comprises three PWM currents, $C_{iR}$, $C_{iG}$ and $C_{iB}$ for driving each type of RGB LEDs, respectively; (b) measuring intensities, $I_{iR}$, $I_{iG}$ and $I_{iB}$, of light emitted from each type of RGB LEDs of an LED strip $S_i$, respectively; (c) determining for the LED strip $S_i$ $$F_{iZ}=(I_{iZ}/\text{gateD})*Z\_\text{duty}$$

$$\text{Chromaticity}_{iZ}=F_{iZ}/(F_{iR}+F_{iG}+F_{iB}); \text{ and}$$

$$\text{Brightness}_i=(F_{iR}+F_{iG}+F_{iB})*\text{Gain}_i,$$

where $F_{iZ}$ is the flux of light of the Z color, gateD is a duty cycle of a gate signal driving the LCD, Z_duty is a duty cycle of the PWM current $C_{iZ}$, and Z=R, G, B; (d) comparing the determined chromaticity and brightness of the light emitted from the LED strip $S_i$ with a reference chromaticity and brightness of light for the LED strips $S_i$; (e) adjusting the PWM driving current $C_i$ supplied to the LED strip $S_i$ so that the chromaticity and brightness of the light emitted from the LED strip $S_i$ are identical to the reference chromaticity and brightness of light for the LED strips $S_i$; and (f) repeating steps (b)-(e) for each of the rest of the plurality of LED strips $\{S_i\}$, so as to make light emitted from the plurality of LED strips $\{S_i\}$ have a uniform chromaticity and a uniform brightness. The reference chromaticity and brightness of light for each LED strips $S_i$ is stored in a LUT.

In one embodiment, the measuring step comprises the steps of: imposing a time delay $\Delta t$ or a phase shift $\Delta\phi$ on the PWM driving current $C_i$ supplied to the LED strip $S_i$; and measuring intensities, $I_{iR}$, $I_{iG}$ and $I_{iB}$, of light emitted from each type of RGB LEDs of the LED strip $S_i$, respectively, when the time delay $\Delta t$ or the phase shift $\Delta\phi$ is detected. The time delay $\Delta t$ or the phase shift $\Delta\phi$ is chosen so that it has no effect on the chromaticity coordinates $Luv_i$ of the light $L_i$ emitted from the LED strip $S_i$. The time delay $\Delta t$ or the phase shift $\Delta\phi$ is substantially small, but is detectable. For example, the phase shift $\Delta\phi$ (or the time delay $\Delta t$) can be chosen to have a value corresponding to a small perturbation in a range of $0$-$\pi/10$, imposed on the PWM driving current $C_i$.

Briefly, the present invention, among other things, discloses a light emitting diode (LED) backlight having a plurality of LED strips, in which driving current supplied to each of the plurality of LED strips is adjusted according to measured differences in chromaticity coordinates between the actual light chromaticity and brightness output by each LED strip and a desired light chromaticity and brightness of each LED so that the LED backlight generates light of a desired color with a uniform brightness, and methods of operating the same.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for operating a light emitting diode (LED) backlight having a plurality of LED strips, $(S_i)$, wherein i=1, 2, 3, ..., N, N being a positive integer, wherein each LED strip $S_i$ is configured to receive a driving current, $C_i$, and in response thereto, to emit light, $L_i$, wherein the light $L_i$ is characterizeable with a chromaticity and a brightness in terms of chromaticity coordinates, $Luv_i$, which is associated with the driving current $C_i$, comprising the steps of:
   a. supplying each of the plurality of LED strips $(S_i)$ with a corresponding driving current $C_i$ by pulse width modulation (PWM) to cause it to emit light $L_i$;
   b. imposing a time delay or a phase shift on a PWM driving current $C_k$ supplied to an LED strip $S_k$ to be monitored, wherein the time delay or the phase shift is chosen so that it has no effect on the chromaticity coordinates $Luv_k$ of the light $L_k$ emitted from the LED strip $S_k$, wherein k=1, 2, 3, ... or N;
   c. measuring the chromaticity coordinates $Luv_k$ of the light $L_k$ emitted from the LED strip $S_k$ when the time delay or the phase shift is monitored;
   d. comparing the measured chromaticity coordinates $Luv_k$ of the light $L_k$ with a reference chromaticity coordinates, $Ruv_k$, of light for the LED strip $S_k$;
   e. adjusting the PWM driving current $C_k$ supplied to the LED strip $S_k$ so that the measured chromaticity coordinates $Luv_k$ are substantially identical to the reference chromaticity coordinates $Ruv_k$ for the LED strips $S_k$; and
   f. repeating steps (b)-(e) for each of the rest of the plurality of LED strips $(S_i)$, so as to make light emitted from the plurality of LED strips $(S_i)$ have a substantially uniform chromaticity and a substantially uniform brightness.

2. The method of claim 1, wherein the adjusting step is performed by adjusting a duty cycle of the PWM driving current $C_k$.

3. The method of claim 1, wherein the adjusting step is performed by adjusting an amplitude of the PWM driving current $C_k$.

4. The method of claim 1, wherein each LED strip $S_i$ comprises a number of red, green and blue (RGB) LEDs spatial-regularly arranged, and wherein each type of RGB LEDs is electrically coupled together.

5. The method of claim 4, wherein the PWM driving current $C_i$ supplied to the LED strip $S_i$ comprises three PWM currents, $C_{iR}$, $C_{iG}$ and $C_{iB}$, to drive each type of RGB LEDs, respectively.

6. The method of claim 1, wherein the reference chromaticity coordinates $Ruv_i$ of light for an LED strips $S_i$ is obtained according to the steps of:
   a. supplying each of the plurality of LED strips $(S_i)$ with a PWM driving current $C_i$ to cause it to emit light $L_i$;
   b. measuring the chromaticity coordinates $Luv_i$ of the light $L_i$ emitted from each of the plurality of LED strips $(S_i)$ individually;
   c. imposing a time delay or a phase shift on a PWM driving current $C_{ref}$ supplied to an LED strip $S_{ref}$ to be referenced, wherein the time delay or the phase shift is chosen so that it has no effect on the chromaticity coordinates $Luv_{ref}$ of the light $L_{ref}$ emitted from the referenced LED strip $S_{ref}$, wherein ref=1, 2, 3, ... or N;
   d. measuring the chromaticity coordinates $Luv_{ref}$ of the light $L_{ref}$ emitted from the referenced LED strip $S_{ref}$ when the time delay or the phase shift is monitored;
   e. calculating a color shift, $\Delta uv_{i,f}$ and brightness shift, $\Delta I_{i,f}$ of the light $L_i$ of the LED strip $S_i$ from the light $L_{ref}$ of the referenced LED strip $S_{ref}$ from the chromaticity coordinates $Luv_i$ and $Luv_{ref}$; and f. adjusting the PWM driving current $C_i$ supplied to the LED strip $S_i$ so that $\Delta uv_{if}=0$, and $\Delta I_{if}=0$, thereby obtaining the reference chromaticity coordinates $Ruv_i$ of light for the LED strip $S_i$, which is corresponding to the chromaticity coordinates $Luv_i$ of the light $L_i$ emitted from the LED strips $S_i$ having $\Delta uv_{if}=0$, and $\Delta I_{if}=0$.

7. The method of claim 6, wherein the reference chromaticity coordinates $Ruv_i$ of light for the LED strips $S_i$ is stored in a lookup table (LUT).

8. A method for operating a light emitting diode (LED) backlight to illuminate a liquid crystal display (LCD), the LED backlight having a plurality of LED strips, $(S_i)$, i=1, 2, 3, . . . , N, N being a positive integer, each LED strip $S_i$ having a number of red, green and blue (RGB) LEDs spatial-regularly arranged, each type of RGB LEDs electrically coupled together and configured to receive a driving current, $C_{iZ}$, and in response thereto, to emit light of a Z color, and Z=R, G or B, respectively, comprising the steps of:
   a. supplying each of the plurality of LED strips $(S_i)$ with a corresponding driving current $C_i$ by pulse width modulation (PWM) to cause it to emit light, wherein the PWM driving current $C_i$ comprises three PWM currents, $C_{iR}$, $C_{iG}$ and $C_{iB}$ for driving each type of RGB LEDs, respectively;
   b. measuring intensities, $I_{iR}$, $I_{iG}$ and $I_{iB}$, of light emitted from each type of RGB LEDs of an LED strip $S_i$, respectively;
   c. determining for the LED strip $S_i$ $F_{iZ}=(I_{iZ}/gateD)*Z\_duty;$ $Chromaticity_{iZ}=F_{iZ}/(F_{iR}+F_{iG}+F_{iB});$ and $Brightness_i=(F_{iR}+F_{iG}+F_{iB})*Gain_i,$ wherein $F_{iZ}$ is the flux of light of the Z color, gateD is a duty cycle of a gate signal driving the LCD, Z_duty is a duty cycle of the PWM current $C_{iZ}$, and Z=R, G, or B;
   d. comparing the determined chromaticity and brightness of the light emitted from the LED strip $S_i$ with a reference chromaticity and brightness of light for the LED strips $S_i$;
   e. adjusting the PWM driving current $C_i$ supplied to the LED strip $S_i$ so that the chromaticity and brightness of the light emitted from the LED strip $S_i$ are identical to the reference chromaticity and brightness of light for the LED strips $S_i$; and
   f. repeating steps (b)-(e) for each of the rest of the plurality of LED strips $(S_i)$, so as to make light emitted from the plurality of LED strips $(S_i)$ have a substantially uniform chromaticity and a substantially uniform brightness.

9. The method of claim 8, wherein the measuring step comprises the steps of:
   a. imposing a time delay or a phase shift on the PWM driving current $C_i$ supplied to the LED strip $S_i$, wherein the time delay or the phase shift is chosen so that it has no effect on a chromaticity and brightness of the light emitted from the LED strip $S_i$; and
   b. measuring intensities, $I_{iR}$, $I_{iG}$ and $I_{iB}$, of light emitted from each type of RGB LEDs of the LED strip $S_i$, respectively, when the time delay or the phase shift is detected.

10. The method of claim 8, wherein the adjusting step is performed by adjusting the duty cycle of the PWM driving current $C_k$.

11. The method of claim 8, wherein the adjusting step is performed by adjusting the amplitude of the PWM driving current $C_k$.

12. The method of claim 8, wherein the reference chromaticity and brightness of light for each LED strips $S_i$ is stored in a lookup table (LUT).

13. A light emitting diode (LED) backlight, comprising:
   a. a plurality of LED strips, $(S_i)$, each LED strip $S_i$ capable of emitting light of a desired color, wherein i=1, 2, 3, . . . , N, N being a positive integer;
   b. a driver unit electrically coupled with the plurality of LED strips $(S_i)$ and configured to individually supply each of the plurality of LED strips $(S_i)$ with a corresponding driving current, $C_i$, by pulse width modulation (PWM) to cause it to emit light, $L_i$, wherein the light $L_i$ is characterizeable with a chromaticity and brightness in terms of chromaticity coordinates, $Luv_i$, which are associated with the supplied current to the LED strip $S_i$;
   c. a sensor unit optically coupled with the plurality of LED strips $(S_i)$ and configured to individually detect the chromaticity coordinates, $Luv_i$, of the light $L_i$ emitted from each LED strip $S_i$; and
   d. a controller in communication with the sensor unit and the driver unit and configured to receive from the sensor unit the detected chromaticity coordinates $Luv_i$ of the light $L_i$ emitted from each LED strip $S_i$, and determine the driving current $C_i$ to be supplied from the driver unit to each LED strip $S_i$ according to the received chromaticity coordinates $Luv_i$ of the light $L_i$ emitted from each LED strip $S_i$ so as to make light emitted from the plurality of LED strips $(S_i)$ have a substantially uniform chromaticity and a substantially uniform brightness.

14. The LED backlight of claim 13, wherein the driver unit, the plurality of LED strips $(S_i)$, the sensor unit and the controller constitute a close loop control system.

15. The LED backlight of claim 13, wherein the driving current $C_i$ supplied from the driver unit to an LED strip $S_i$ is in the form of a PWM signal having a duty cycle and amplitude that are adjustable.

16. The LED backlight of claim 15, wherein each LED strip $S_i$ comprises a number of red, green and blue (RGB) LEDs spatial-regularly arranged, and wherein each type of RGB LEDs is electrically coupled together.

17. The LED backlight of claim 16, wherein the PWM driving current $C_i$ supplied to the LED strip $S_i$ comprises three PWM currents, $C_{iR}$, $C_{iG}$ and $C_{iB}$, adapted for driving each type of RGB LEDs, respectively.

18. The LED backlight of claim 13, wherein the controller imposes a time delay or a phase shift on a PWM driving current $C_k$ supplied to an LED strip $S_i$ to be monitored, and wherein the time delay or the phase shift is chosen so that it has no effect on the chromaticity coordinates $Luv_i$ of the light $L_i$ emitted from the LED strip $S_i$.

19. The LED backlight of claim 18, wherein the sensor unit detects the time delay or the phase shift so as to determine the light emitted from which LED strip to be measured.

20. The LED backlight of claim 13, further comprising a lookup table (LUT) stored in the controller, and wherein the LUT contains information of and the reference chromaticity coordinates $Luv_i$ of the light $L_i$ and corresponding driving current for each of the plurality of LED strips $(S_i)$.

* * * * *